(12) United States Patent
Morgan et al.

(10) Patent No.: US 8,084,881 B2
(45) Date of Patent: Dec. 27, 2011

(54) WIND-DRIVEN ELECTRICITY GENERATION DEVICE WITH SEGMENTED ROTOR

(75) Inventors: Ken Morgan, San Diego, CA (US); Micheal Slattery, San Diego, CA (US)

(73) Assignee: Helix Wind, Incorporated, Poway, CA (US)

( * ) Notice: Subject to any disclaimer, the term of this patent is extended or adjusted under 35 U.S.C. 154(b) by 0 days.

(21) Appl. No.: 13/018,496

(22) Filed: Feb. 1, 2011

(65) Prior Publication Data

US 2011/0121580 A1 May 26, 2011

Related U.S. Application Data

(63) Continuation of application No. 11/705,844, filed on Feb. 13, 2007, now Pat. No. 7,948,110.

(51) Int. Cl.
F03D 9/00 (2006.01)
H02P 9/04 (2006.01)

(52) U.S. Cl. .......................................... 290/55; 290/44

(58) Field of Classification Search .................. 290/44, 290/55
See application file for complete search history.

(56) References Cited

U.S. PATENT DOCUMENTS

| | | | | |
|---|---|---|---|---|
| 1,100,332 A * | 6/1914 | Smith | ............................ | 416/175 |
| 1,697,574 A * | 1/1929 | Savonius | ............................ | 416/110 |
| 1,835,018 A * | 12/1931 | Darrieus | ............................ | 415/224 |
| 2,020,900 A * | 11/1935 | Methvin | ............................ | 416/227 R |
| 3,208,722 A * | 9/1965 | Rodriquez et al. | ......... | 415/122.1 |
| 3,672,017 A * | 6/1972 | Nielsen et al. | ................. | 407/49 |
| 3,918,839 A * | 11/1975 | Blackwell et al. | ............ | 416/175 |
| 3,967,507 A * | 7/1976 | Emms | ................................. | 74/6 |
| 4,039,849 A * | 8/1977 | Mater et al. | ...................... | 290/55 |
| 4,236,866 A * | 12/1980 | Zapata Martinez | ............ | 415/4.4 |
| 4,293,274 A * | 10/1981 | Gilman | ............................ | 416/51 |
| D300,932 S * | 5/1989 | Sikes | ................................ | D15/1 |
| 5,131,785 A * | 7/1992 | Shimazaki | .................... | 403/326 |
| 5,261,801 A * | 11/1993 | Stone | ................................ | 418/69 |
| 5,463,257 A * | 10/1995 | Yea | ................................... | 290/55 |
| 5,760,515 A * | 6/1998 | Burns | ........................... | 310/115 |
| 5,816,113 A * | 10/1998 | Fohl | ................................ | 74/552 |
| 5,941,131 A * | 8/1999 | Fohl | ................................ | 74/552 |
| 6,172,429 B1 * | 1/2001 | Russell | ........................... | 290/54 |
| 6,287,082 B1 * | 9/2001 | Dittmar | ........................... | 417/68 |
| 7,093,513 B2 * | 8/2006 | Bostbarge | ....................... | 74/424 |
| 7,132,760 B2 * | 11/2006 | Becker | ............................ | 290/55 |
| 7,344,353 B2 * | 3/2008 | Naskali et al. | ................. | 415/4.2 |
| 7,362,004 B2 * | 4/2008 | Becker | ............................ | 290/55 |
| 7,948,110 B2 * | 5/2011 | Morgan et al. | .................. | 290/55 |
| 2002/0197104 A1 * | 12/2002 | Bauman et al. | ............... | 403/274 |
| 2004/0061337 A1 * | 4/2004 | Becker | ............................ | 290/44 |
| 2004/0206151 A1 * | 10/2004 | Bostbarge | ....................... | 72/377 |

(Continued)

*Primary Examiner* — Pedro J Cuevas
(74) *Attorney, Agent, or Firm* — Thibault Patent Group

(57) ABSTRACT

A vertical wind-driven electricity generation device is described, which utilizes a unique segmented Savonius rotor and which is easily handled, transported, assembled and maintained, even by a single person. The blades of the rotor are segmented into a plurality of modest size blade pair segments, each of which comprises two (or optionally, three or four) low height, helically curved blade portions. The blade pair segments are preferably of the same height and diameter. The rotor is mounted on a central vertical shaft connected to a generator. When the plurality of blade portions are installed on the device's central shaft, the overall blade configuration functions as an unitary Savonius rotor. Flow of gas (normally air in the form of wind) causes the segmented Savonius rotor to move, turning the shaft and rotating member of the generator to rotate, causing the generator to generate electricity.

20 Claims, 6 Drawing Sheets

U.S. PATENT DOCUMENTS

| | | | |
|---|---|---|---|
| 2006/0198724 A1* | 9/2006 | Bertony | 415/4.4 |
| 2006/0257240 A1* | 11/2006 | Naskali et al. | 415/4.4 |
| 2007/0018464 A1* | 1/2007 | Becker | 290/55 |
| 2007/0029807 A1* | 2/2007 | Kass | 290/55 |
| 2008/0191487 A1* | 8/2008 | Morgan et al. | 290/55 |
| 2008/0246284 A1* | 10/2008 | Pelman et al. | 290/55 |
| 2008/0273974 A1* | 11/2008 | Becker | 416/7 |
| 2009/0189395 A1* | 7/2009 | Ryynanen et al. | 290/53 |
| 2009/0295293 A1* | 12/2009 | Lawton et al. | 315/76 |
| 2010/0270808 A1* | 10/2010 | Bates et al. | 290/55 |
| 2010/0278653 A1* | 11/2010 | Sassow | 416/223 R |
| 2010/0284809 A1* | 11/2010 | Houlsby et al. | 416/178 |
| 2010/0320771 A1* | 12/2010 | Urch | 290/55 |
| 2010/0322770 A1* | 12/2010 | Sheinman | 416/176 |
| 2011/0006542 A1* | 1/2011 | Burrell, IV | 290/55 |
| 2011/0027084 A1* | 2/2011 | Rekret | 416/126 |
| 2011/0081243 A1* | 4/2011 | Sullivan | 416/120 |
| 2011/0107684 A1* | 5/2011 | Flores | 52/29 |
| 2011/0121580 A1* | 5/2011 | Morgan et al. | 290/55 |

* cited by examiner

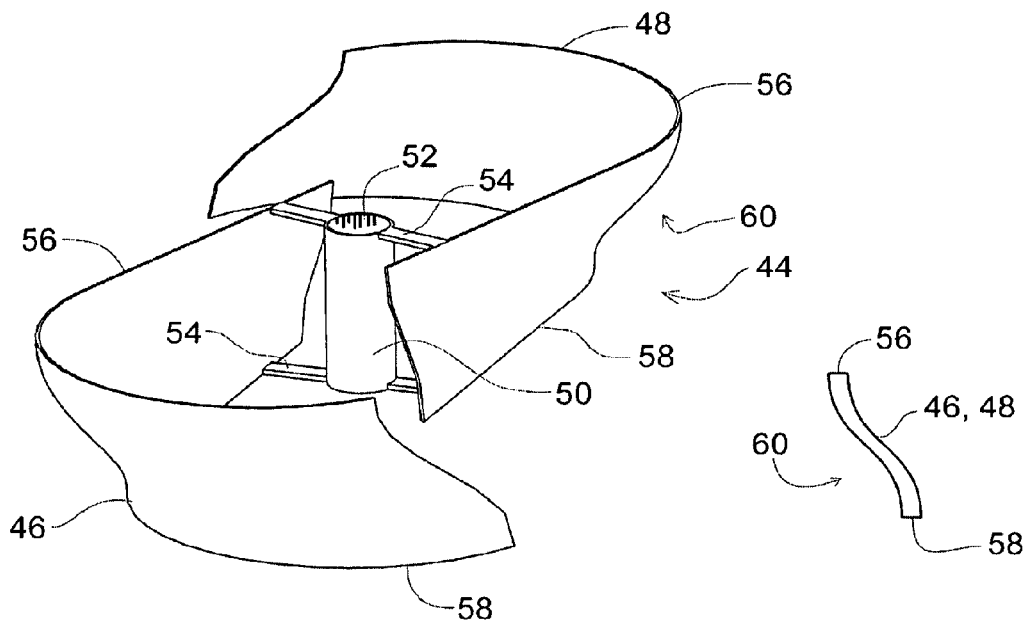
FIGURE 3
FIGURE 4
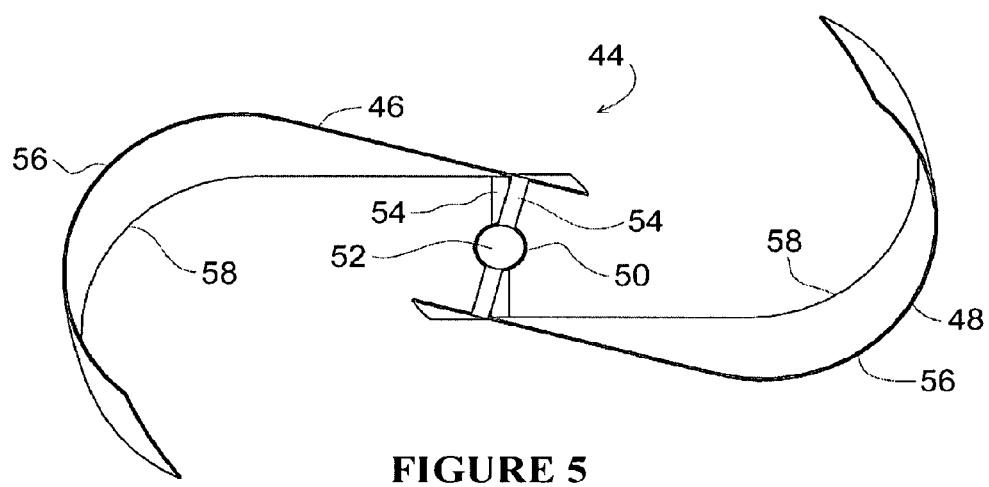
FIGURE 5

WIND-DRIVEN ELECTRICITY GENERATION DEVICE WITH SEGMENTED ROTOR

CLAIM OR PRIORITY

This application is a continuation application and claims the benefit under 35. U.S.C. 120 of U.S. patent application Ser. No. 11/705,844, filed on Feb. 13, 2007, now U.S. Pat. No. 7,948,110 entitled, "WIND-DRIVEN ELECTRICITY GENERATION DEVICE WITH SAVONIUS ROTOR".

FIELD

This invention relates to electric power generators and segmented rotors. More particularly it relates to electric power generators which are driven by wind energy through a segmented Savonius rotor and can be used in small installations such as individual residential installations.

BACKGROUND

Wind-powered or wind-driven electricity generation devices, are a significant source of renewable electrical energy. Some are aligned horizontally, mounted on tall masts and resembling large propeller-equipped aircraft engines, and others are vertically aligned and equipped with two or more elongated vertical sail-like rotors. The present invention involves the latter group. While there have been many designs proposed or used for the wind-driven vertical rotors which drive the generators, very few have used Savonius drag-type rotors. It has been believed that lift-type rotors were more efficient for large scale devices, and Savonius rotors have been used primarily in small scale devices. See, e.g., Hayashi et al., *JSME Int'l. J.*, Series B:48 (1), 9-16 (2005).

In its most basic configuration, a Savonius rotor has an S-shaped cross-section and consists of a "blade pair" comprising two interconnected vertical blades with a small overlap between them. The blade pair is unitary and is mounted on a central vertical shaft. Commercial devices with Savonius rotors with unitary blade pair designs have been marketed by one manufacturer for small scale residential power generation. The same manufacturer has also commercialized similar devices in smaller sizes as chargers for batteries in such small installations as emergency beacons and small boat lighting. These are generally shown as requiring shaft support at both top and bottom of the rotor. In all of these designs each blade in the blade pair is also a unitary structure.

Savonius rotors may also have more than two interconnected blades; see, e.g., Grinspan et at., PROC. OF 28TH NAT'L. CONF. ON FLUID MECHANICS AND FLUID POWER, pp. 428-431 (Chandigarh, India: 2001). For the purposes of the invention herein, the number of blades is not critical, and two, three, four or more blades (two or three blades are the most practical) are all to be considered included in the invention. The term "blade pair" as used herein, therefore, shall be considered to encompass all such pluralities of blades, not just those containing only two blades. For brevity, however, the invention shall be discussed with respect to a two-blade "blade pair," the preferred embodiment of the invention.

The inclusion of unitary blade pairs in any size other than the very smallest in such devices severely limits the devices use in many environments and for many uses because of problems in assembly, installation, maintenance and repair. Unitary blade pairs are large, heavy and unwieldy to handle and to install. Since the rotor is attached to the central vertical shaft over its entire length, this necessitates that for assembly, installation, repair and maintenance of the device the entire rotor must be handled as a single unit. For all except the smallest devices equipment such as a crane or some other type of large overhead lifting device must be employed. Efforts to avoid such problems have been made by providing intermediate structural supports, such as a series of horizontal plates, to the unitary vertical blades (Hayashi, supra.). While these may prevent or reduce the extent of damage to such a blade, repair or replacement of a damaged blade will still require the use of substantial removal and repair equipment and facilities. Such considerations belie the advertisement of vertical wind-driven electrical generation devices as suitable for residential use, since their installation, maintenance and other aspects of their use, even if nominally in a residential setting, necessarily requires the services of professional personnel using industrial equipment.

It would therefore be of substantial interest to have a commercially available wind-driven electrical generation device which would be a true "residential" installation level or small business installation level device, in that it could be readily handled, transported, assembled and maintained by a single individual such as a homeowner or small business owner or operator, without the need for assistance by heavy equipment. Such a device would be capable of producing a significant amount of electrical energy, either for direct use by the device owner such as for lighting or other power requirements, or for feedback into the electrical power grid to which the residence or business facility is connected, thus allowing the device owner to obtain electrical service credits against the fees otherwise charged for the electrical service provided from the grid. The device of the present invention provides these properties in a new and unique structure.

SUMMARY

The invention herein is a vertical wind-driven (also known as wind-powered) electrical generation device, which utilizes a unique segmented Savonius rotor which is easily handled, transported, assembled and maintained, even by a single person. The blade pairs of the present device have total lengths equivalent to some prior art vertical devices and can generate equivalent levels of electrical energy, but do not require the use of industrial-level handling facilities and equipment, nor do they suffer the high risk level of catastrophic damage or failure that unitary blades do.

In the present device, the blade pairs are segmented into a number of modest size, easily handleable blade pair segments, each of which comprises two (or optionally, three or four) low height, helically curved blade portions. The blade pair segments all are of the same height and diameter. When all of the blade pair segments are installed on the device's central shaft, the overall blade pair configuration operates in the manner of an unitary blade pair Savonius rotor with a double helical twist. The center of each blade pair segments comprises a hollow sleeve, grooved or channeled to interfit with the polygonal cross-section or splined exterior of the central shaft. The abutting upper/lower surfaces of adjacent blade pair segments correspond in size and shape so that when assembled into the overall rotor configuration, no significant gaps exist between adjacent blade pair sets. The helical twist to each blade pair segment insures that correspondence with adjacent segments above and below is obtained and that, as each blade pair segment is offset along the shaft from its immediate neighbors, the desired helical configuration of the overall rotor is also obtained.

Assembly of the device is uniquely simple. A simple base structure is assembled, usually from common struts, and the generator device and shaft bearings are mounted on the base structure. The vertical shaft is then inserted through the bearings and into operable contact with the generator. Finally, each blade pair segment is slid onto the shaft until the overall desired height of the rotor structure is obtained, and a locking cap is secured to the top of the unit to retain the rotor configuration. These assembly steps may be easily completed by a single person or two people working together, without need for anything more than simple hand tools such as used to bolt together the base struts.

The device can be manufactured quite inexpensively, since there are few parts and they are either commonly available (such as the struts and the generator) or they are readily molded in the desired shapes (the blade pair segments). Since the blade pair segments in a single device are preferably of identical dimensions, only a single mold is necessary to be able to manufacture all of the blade pair segments for that device. A wide range of device heights can be obtained, simply by designating how many blade pair segments are to be mounted on an appropriately dimensioned shaft. Similarly, a wide variety of device diameters can be obtained, simply by use of molds for forming blade pair segments of different dimensions. Thus many embodiments of the devices of the invention are available, preferably in packaging such as kits, each including a set of individual blade pair segments that can be assembled to form the rotor which may be easily handled, transported and assembled.

DESCRIPTION OF THE DRAWINGS

FIG. 3 is a perspective view of a single blade pair segment from above and to the side of the segment;

FIG. 4 is a cross sectional view of a blade portion in the blade pair of FIG. 3;

FIG. 5 is a top view of the blade pair segment of FIG. 3;

DETAILED DESCRIPTION AND PREFERRED EMBODIMENTS

Figure 1:
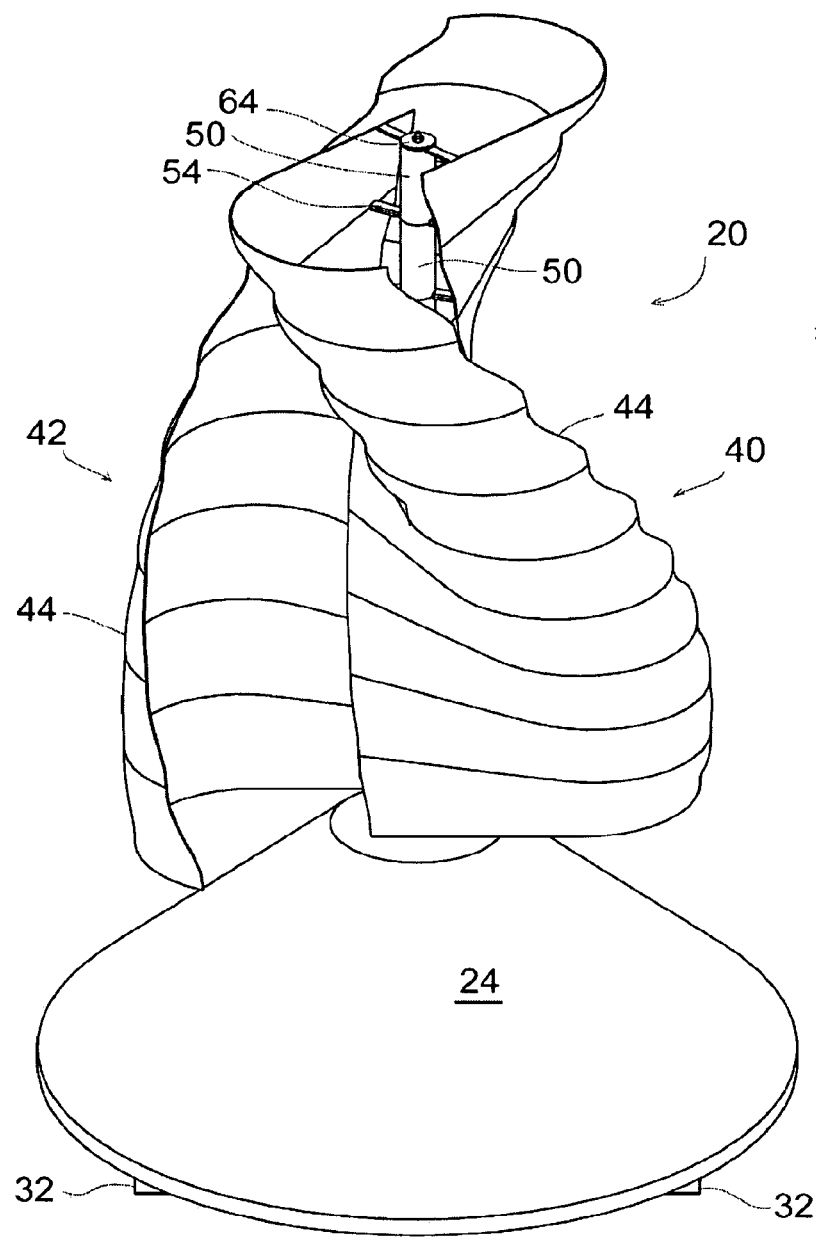
FIG. 1 is a perspective view of a device of the present invention.
Figure 2:
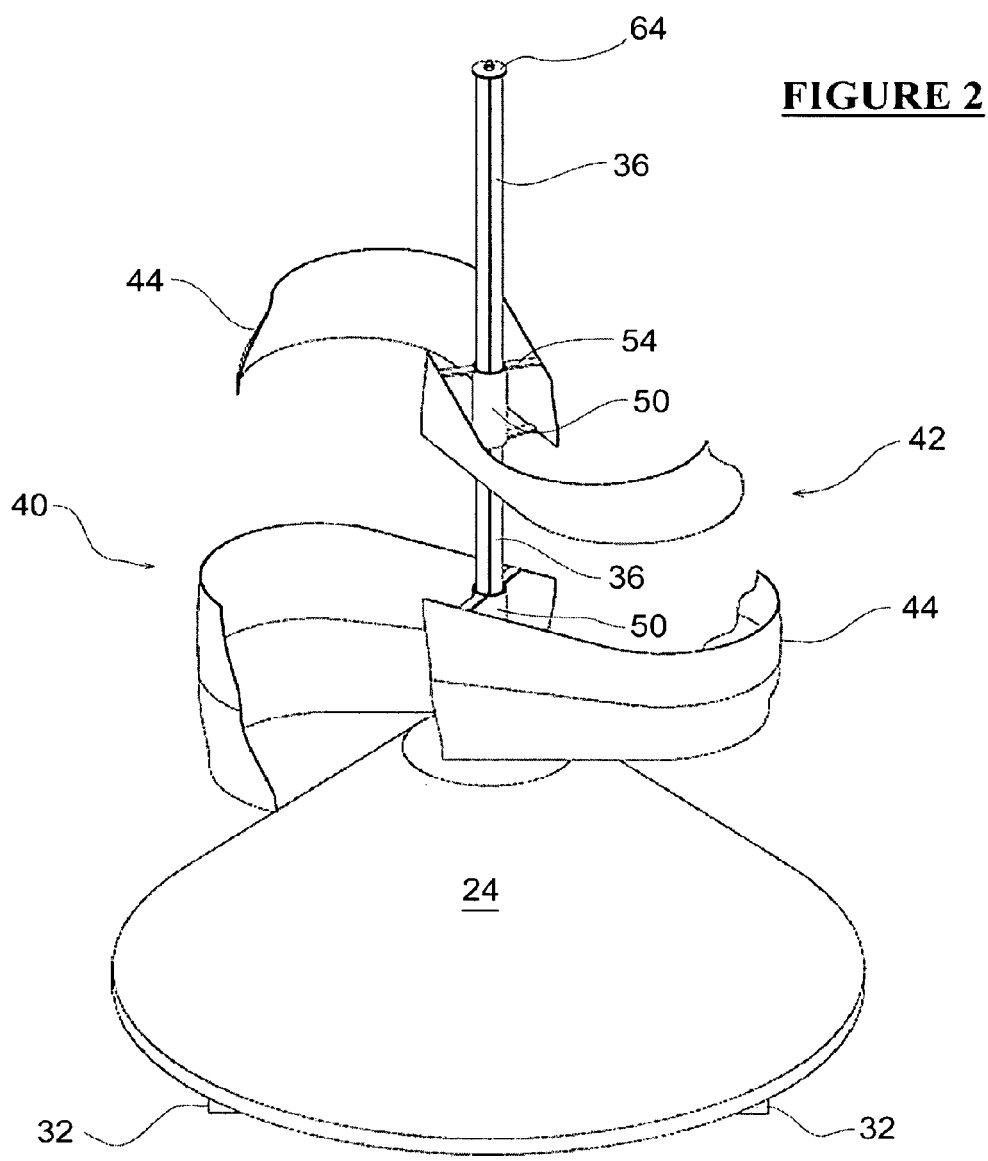
FIG. 2 is a perspective view of the device showing three representative blade pair segments.
Figure 8:
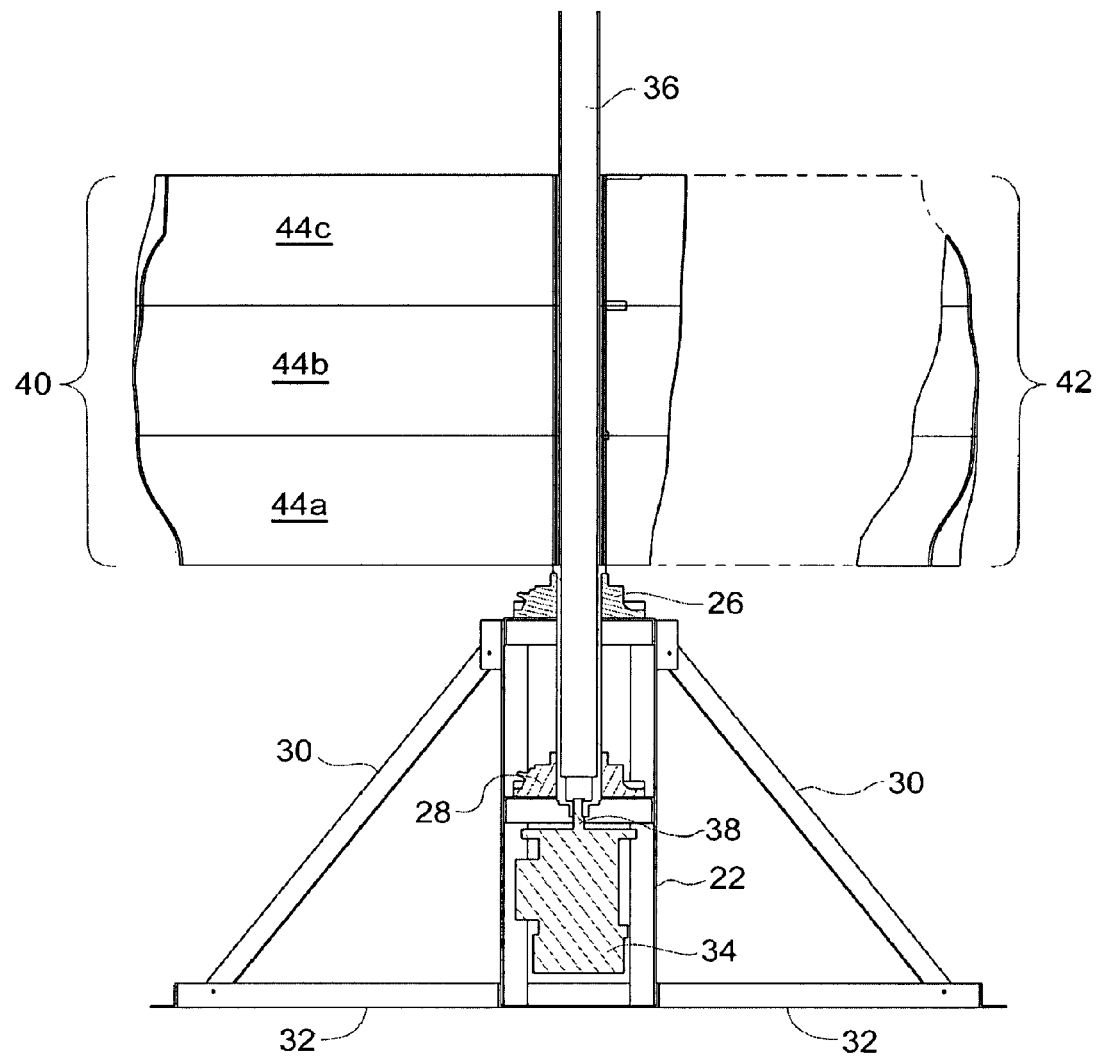
FIG. 8 is a centerline elevation view, partially in section, of the lower portion of the device of FIG. 1, and including portions of the three lowermost blade pair segments.
Figure 9:
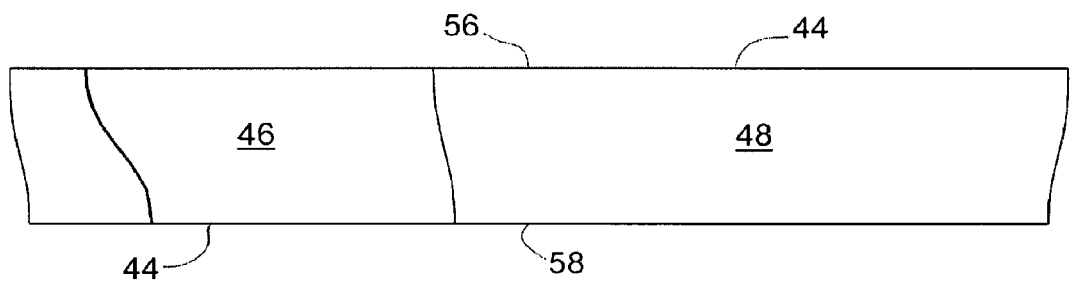
FIG. 9 is a side elevation view of the blade pair segment of FIG. 3.

The invention will be best understood by reference to the drawings, particularly FIGS. 1, 2 and 8. In the embodiment illustrated the device 20 has a base 22 which for appearance may be covered by a cone shaped skirt 24. Included in the base 22 structure are shaft bearings 26 and 28. Supporting struts 30 are disposed radially around the base 22, are attached thereto at their top ends, and extend diagonally downward. While for clarity only two of the of the supporting struts 30 are shown in FIG. 8, it will be evident that full support of the device will require at least three such struts and preferably four to eight struts. Normally the struts will be disposed equally spaced around the base 22 of the device, although unequal spacing may be desirable if the device is to be installed on particularly uneven ground. The struts 30 will be attached at their lower ends to ground contact structure 32 which may be in the form of a circular or polygonal flat panel or may be made up of radially projecting rods or bars to which the lower ends of the struts 30 are connected. The base 22 will normally be centered with respect to structure 32, either seated thereon or disposed at the inner ends of the projecting bars and attached thereto. While the struts 30 and ground structure 32 are usually symmetrical to simplify manufacturing and assembly, ground structure shape and strut lengths and positioning may be varied to fit actual ground conditions and configuration at the location where the device is to be installed. Also within the base 22 is an electricity generator 34, of which a suitable example is a permanent magnet generator which outputs variable DC power to an inverter/grid tied system.

The base, ground structure and struts as described above permit the device to be placed on any generally horizontal solid supporting surface, including not only the ground but also structures such as support slabs, decks, flat roofs, and the like. The base, ground structure and struts may also be modified to permit the device to be mounted on non-horizontal surfaces such as poles, towers, hillsides or sloping rooftops if desired. The nature of such modifications will be evident to those skilled in the art, and will be dependent upon the specific use location and the apparatus with which the device is integrated.

Mounted in bearings 26 and 28 is elongated vertical shaft 36. Shaft 36 will be formed as an elongated rod having a uniform, preferably circular in cross-section with one or more splines running longitudinally along the surface thereof. The cross-section of the shaft 36 may alternatively be polygonal, such as square or hexagonal. It will be formed of a material such as steel, aluminum or reinforced composite material which has sufficient strength and stiffness to maintain the shaft in a vertical orientation over its entire length notwithstanding that it is normally supported only at its lower end by bearings 26 and 28. While the upper end of shaft 36 could be supported by a separate bearing mounted in some type of external supporting structure, such is not necessary nor desirable. It is a preferred feature of this device that it be freestanding, supported only by its base and ground support structure, thus greatly simplifying the assembly and operation of the device.

At its lower end shaft 36 is operably attached at 38 to the rotor member of generator 34, so that rotation of shaft 36 will rotate the rotor member of generator 34 and generate electricity in the conventional manner of generators. For the purpose of this invention the nature of the generator is not critical, other than that it must be of a size and generation capacity appropriate to the size of the device of this invention, and must be compatible with any electric grid system to which it may be connected. Similarly, any suitable coupling device or structure (such as a universal joint, a gearbox, or a combination of these) between the shaft 36 and the generator 34 at 38 may be used.

Mounted vertically along the length of shaft 36 above upper bearing 26 and attached thereto (in a manner to be described below) are at least two parallel segmented blades 40 and 42. A third or fourth blade in parallel with blades 40 and 42 may be present, but are not preferred, as their presence will unduly complicate the device without significantly improving performance. As best seen in FIG. 1, the two blades 40 and 42 form a vertical helical structure which catches wind flow and rotates in the wind stream, rotating the shaft 36 which in turn rotates the rotor member of the generator 34 and produces an electric current. Unlike in the prior art devices, in which unitary blades of various configurations were required, in the present device a critical element is that the vertical blades 40 and 42 are not unitary in structure, but are formed by multiple interlocking blade pair segments 44, each having two or more blade portions extending from a center sleeve. The blade pair segments 44 are uniform in height and diameter in progression up the shaft 36, so that the overall blades 40 and 42 have the configuration of two parallel helical surfaces. (For convenience and brevity herein, the various blade pair segments will collectively be referred to by "44" since they are preferably identical regardless of their diameter or intended position along the shaft 36. Where individual blade pair segments are to be differentiated, the designations "44a", "44b" and so forth will be used.)

Each blade pair segment 44 comprises two blade portions 46 and 48, which will be seen to be segments of the overall blades 40 and 42. The blade portions 46 and 48 are attached at their inner ends to a vertical hollow sleeve 50 by short struts 54 at the top and bottom of sleeve 50. The spacing of the two blade portions (i.e., the length of the struts 54) and the overlap of the two blade portion ends are not critical, and may be varied as desired, recognizing that overly long struts are more prone to bending and overly long overlaps will reduce blade efficiency. The open spacing between the sleeve 50 (and thus the central shaft) and the blade portions in each blade pair segment 44 allows for maximum air flow through the device. This results in significantly greater (typically about 10%) efficiency over prior art devices which do not have such spacings.

The shape of the blade portions 46 and 48 is unique and critical. Each blade portion, and therefore blade pair segment, has a varying helical twist about the shaft 36 axis creating the wave-like appearance of the assembled rotor. The variation creates an integral stiffness in the blade to resist bending and deformation under aerodynamic load. In the preferred embodiment of the invention the twist varies with a continuous mathematical function such that the gradients at upper and lower surfaces are equal providing a smooth transition between adjoining blades. The helical twist results in the bottom edge 58 and the top edge 56 being offset. The helical pitch angle will be in the range of about 5.degree.-30.degree., preferably 10.degree.-20.degree., and more preferably about 15.degree., as illustrated at 60. The three-dimensional curvature indicated by 60 also serves to provide natural mechanical stiffness in the blade material. The function governing the variation in twist need not be smooth to provide the integral stiffness. Alternatively, or in combination with the curvature, stiffening ribs or other structural components could be added to each blade portion to achieve the same effect.

The adjacent blade pair segments 44a, 44b, 44c, etc., (FIG. 8) will be aligned by the sleeve and shaft connections (discussed below) such that the top edge 56 of blade pair segments 44a will be identical in length and shape to the bottom edge 58 of blade pair segments 44b, the top edge 56 of blade pair segments 44b will be identical in length and shape to the bottom edge 58 of blade pair segments 44c, and so forth proceeding upwardly along the device, so that each overall blade 40 and 42 project essentially a single unbroken helical surface to the wind flow. Partial or full gaps between the blade pair segments will diminish the effectiveness of the device, as such gaps provide spaces for air to flow through the blades 40 and 42 without imparting a rotational force to the blades. While some gaps may appear because of manufacturing limitations or wear of the blade portions in use, such gaps are to be held to a minimum in both size and number and are to be avoided as much as possible. To facilitate alignment of adjacent blade pair segments and to help minimize gaps between the blade pair segments, one may if desired configure the adjacent top and bottom edges of the adjacent blade pair segments as tongue-in-groove structures or other conventional interlocking structures.

Figure 6:
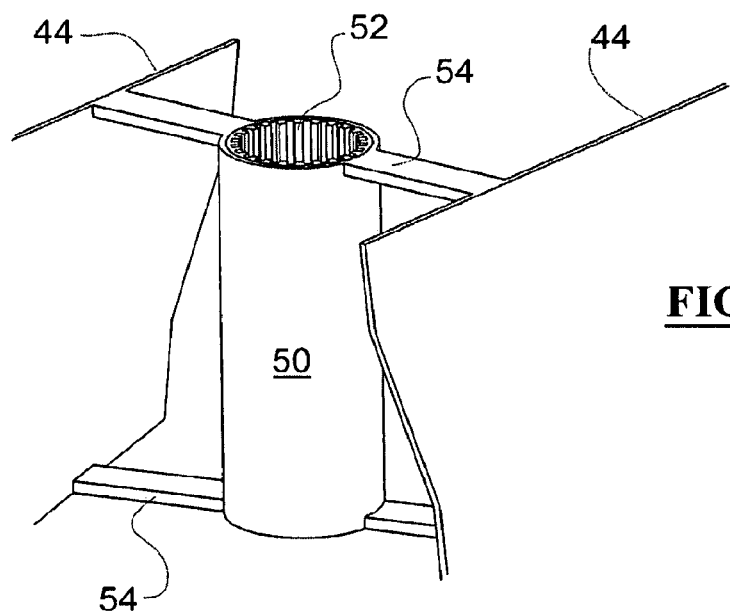
FIG. 6 is a detail perspective view showing the center shaft sleeve of the blade pair segment of FIG. 3.
Figure 7:
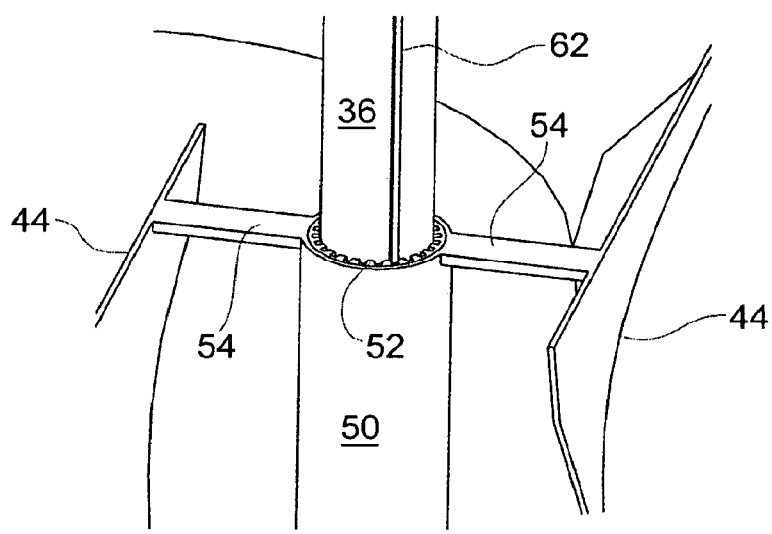
FIG. 7 is a detail perspective view showing the interfitting of the center shaft of the device with the sleeve of the blade pair segment of FIG. 3.

The blade pair segments 44 are attached to the shaft 36 in a secure but easily removable manner in which the outer surface of the shaft 36 and the inner surface 52 of the sleeves 50 interfit. As best seen in FIGS. 6 and 7, the inner surface 52 of the sleeve 50 is formed with longitudinal grooves, channels or similar shaped slots (referred to herein collectively as "grooves") which extend for the length of the sleeve and allow the sleeve to conform to the cross-sectional shape of shaft 36, whether the shaft is circular in cross-section with external splines such as 62 or polygonal (e.g., square or hexagonal) in cross-section. There will be several grooves in the interior of sleeve 50 since the blade pair segments 44 must be rotated by a fixed angle in the progression of sets up the shaft to form the overall helical blade configuration. The number of grooves will be determined by the cross-sectional shape of the shaft (i.e., how many projecting vertices or splines are present) and by the number of blade pair segments which must be used to make a single turn fraction of the helix. A turn fraction is defined herein as the fraction of a complete rotation around the shaft which must be completed before the sleeve interior configuration and the shaft external configuration start repeating the preceding symmetry. For instance, a square shaft will result in four turn fractions while a hexagonal shaft will result in six turn fractions. The grooves/vertices correspondence is analogous to that of socket wrench configurations for turning square or hexagonal bolt heads or nuts. Determination of appropriate grooving, channeling, splining and shaft shapes for any desired blade helix may be readily determined by those skilled in the art. FIGS. 2 and 7 illustrate how the blade pair segments 44 turn in steps around the shaft 36 by interfitting of consecutive grooves and vertices/splines as adjacent blade pair segments 44a, 44b, etc. are mounted on the shaft 36. A helical structure that requires about 8-10 blade pair segments per half-turn around the shaft has been found to be quite satisfactory.

It will be recognized by those skilled in the art that while the embodiments of the sleeve 50 are defined with recessed grooves to interfit with projecting splines or vertices on the shaft 36, it is also feasible for the recessed grooves to be on the shaft and projecting splines or ribs to be on the inside of the sleeve. It is considered more practical for fabrication and assembly purposed, however, for the sleeve to have the grooves and the shaft to have the vertices or splines, and therefore that embodiment is preferred.

While the blade pair segments have been described in their preferred embodiments with identical heights in a device, it is contemplated that blade pair segments of unequal heights could be used. This is not preferred, however, since it would require that all blade pair heights in a single device be coordinated for overall height and degree of helical twist also be coordinated to insure that the overall helical surface of the blades 40 and 42 be obtained. Similarly, since adjacent blade pair segments must conform at their abutting edges, the result would effectively be that shorter, less twisted blade pair segments would have to be compensated for by taller, more twisted blade pair segments elsewhere in the assemblage. Such complexity, while overall producing a operable device, is unnecessary and is to be avoided.

In FIGS. 3 and 5 the blade portions 46 and 48 in a blade pair segment are shown in an embodiment with what can be defined as a counter-clockwise curvature, with the curvature of each blade portion taken as starting from the point of attachment to the sleeve 50, i.e., the struts 54. This embodiment is also shown in the other Figures. The direction of the helical twist of the blade could also be reversed from that shown in FIG. 1. Thus the lower edge of the blade would appear to lead the rotation rather than the upper edge as shown in the Figures. All other parameters mentioned could be varied in the same manner. This would not affect the direction of rotation of the turbine. In yet another embodiment, the curvature of each blade portion 46 and 48 can be reversed, to be clockwise, which will in turn be reflected in the rest of the device, producing a device which, e.g., in a FIG. 1 view would display an opposite helical appearance to what is shown in the present FIG. 1. A device with a clockwise curvature is entirely feasible and is to be considered within the scope of this invention. This last embodiment is not favored, however, since conventional electricity generators are normally constructed with a rotation consistent with the counter-clockwise embodiment of the present invention, making the counter-clockwise embodiment the preferred embodiment. Use of the alternative, clockwise embodiment of the invention would thus require either a "reversed" generator or a geared connection to a conventional generator which would reverse the direction of rotation of the clockwise Savonius rotor as part of the connection to the conventional generator.

The segmenting of the blades 40 and 42 into the significantly smaller blade pair segments 44 simplifies the assembly, operation and repair of the device of this invention, as compared with prior art devices, and most importantly make the device feasible for use by individual homeowners and owners of small businesses. The device is generally of overall height of about 3-15 ft (1-5 m) and overall greatest diameter of 3-5 ft (1-1.7 m). Such size is adequate to drive a generator to produce a significant amount of electricity and yet be within the capability of homeowners, small business owners and others to set up and maintain without the need for large scale maintenance and handling equipment or repair facilities. Blade portions 46 and 48 in the blade pair segments will normally be about 6-24 in (15-60 cm), preferably about 8 in (20 cm), in height.

Assembly and set up of the device is straight-forward. Once a suitable ground location is determined with good wind flow and the ground location is leveled to the extent required, the ground structure and struts 32 and 30 are assembly and the base 22 mounted thereto. The shaft 36 is inserted through the bearings 26 and 28 and attached to the generator 34. The blade pair segments 44 are then mounted seriatim on the shaft 36 as shown at 44a, 44b, 44c, . . . with the required turn between each adjacent blade pair segment until the maximum height desired is reached. A clip, washer-and-nut or other suitable cap 64 is then placed at the top of the sleeve 50 of the uppermost blade pair segment and secured to hold the blade pair segments 44 in position as the blade pairs and shaft rotate in response to the wind flow. Preferably the shaft length and total heights of the blade pair segments will correspond so that the cap 64 can be mounted directly on the upper end of the shaft 36 and maintain the blade pair segments in secure configuration. Alternatively, a collar-type cap can be used if it is desired to have a longer shaft (such as when it may be desired to add additional blade pair sets in the future); the collar-cap would then include means to be locked against the top blade pair segment sleeve at intermediate positions along the shaft 36.

The blade pair segments may be made of any moldable or formable material, such as plastic, rubber or metal. Sheet metal blade portions 46 and 48 may be stamped into the required shapes and then attached to the struts 54 and sleeve 50 by conventional metal joining techniques such as spot welding or brazing. Similarly thermosetting polymeric materials can be molded into the blade portions 46 and 48 and then joined to metal or preferably polymeric struts and sleeves by conventional polymer joining techniques such as thermal or RF welding or by suitable adhesives. More preferably, however, whenever possible an entire blade pair segment of a single polymeric material will be molded simultaneously as a single unit. To this end the struts 54 may be offset to enable the finished piece to be removed from the mold. It may also be necessary to use a multi-piece mold to allow the curved blade portions to be released from the mold. Thermoplastic and elastomeric materials may also be used with due regard for their performance when exposed to high winds or high ambient temperatures. Elastomeric materials may be preferred if there are significant risks of impact of objects against the blades in a particular operating environment, such as where cones, nuts or other debris may fall from neighboring trees into the wind stream that activates the device. Those skilled in the art of materials and material shaping can readily determine the appropriate materials and formation methods for blades of the devices depending on the use intended and the location into which the device will be placed.

The generator may be connected to a local power grid or to a local powered device (such as lighting) via a power inverter or similar device in a conventional manner, which need not be shown or discussed in detail herein. It is contemplated that the most effective use of the device is to be connected to a power grid, so that the device can feed back electrical energy into the grid and reduce the net amount of grid energy that the residence or business facility uses, thereby reducing the energy usage fees charged by the grid operator to the homeowner or business operator. Alternative uses can be to power directly local household or business lighting, appliances, security cameras or units or other electrical devices, or to charge batteries for stand-by emergency service. Other potential uses will readily be apparent to those skilled in the art. The device can serve multiple purposes, in that it can be used for local service as needed or on a predetermined schedules and when not in such service, be used to feed generated energy into the connected grid or charge batteries.

Although several embodiments of the invention have been described above by way of example only, it will be understood by those skilled in the art that numerous variations and modifications may be made to the disclosed embodiments without departing from the scope or spirit of the invention, as it is defined by the appended claims.

We claim:

1. An apparatus for wind-driven generation of electricity, comprising:
   a rotatable elongated shaft comprising an external configuration, the external configuration comprising a cross-sectional geometric shape resulting in a plurality of vertices an electrical generator connected to one end of the shaft;
   a segmented rotor comprising a plurality of blade segments, each of the blade segments comprising:
      a sleeve for installation over the shaft, the sleeve comprising a sleeve interior configuration comprising a plurality of grooves formed longitudinally along an interior sleeve surface for mating with at least one of the plurality of vertices;
      at least two blades that are positioned in a fixed relationship with respect to one another; and
      means for connecting the blades to the sleeve;
   wherein the number of grooves on the sleeve is proportional to the number of blade segments required to complete a single turn fraction of the rotor.

2. The apparatus as in claim 1 wherein each of said blade segments comprise two, three or four blades.

3. The apparatus as in claim 2 wherein each of said blades comprises a first edge and a second edge, each edge comprising a helical curve, such that at an end thereof distal from said shaft, said first edge is offset from said second edge by a helical angle.

4. The apparatus as in claim 3 wherein said helical curve varies with a continuous mathematical function such that the gradients at upper and lower edges are equal, thereby providing a smooth transition between adjoining blade segments.

5. The apparatus as in claim 3 wherein said curve varies with a continuous mathematical function such that curvature gradients at the first edge of a first blade of a first blade segment and the second edge of a second blade of a second blade segment are equal, providing a smooth transition between adjoining segments.

6. The apparatus as in claim 5 wherein each blade comprises stiffening ribs, whereby stiffness is imparted to each blade.

7. The apparatus as in claim 2 further comprising each of said blades being more elongated in its extension from said sleeve than in its extension along said sleeve.

8. The apparatus as in claim 7 wherein the means for connecting the blades to the sleeve comprises at least one, fixed strut connecting each of said blades, respectively, to a sleeve exterior.

9. The apparatus of claim 1, wherein the turn fraction comprises a fraction of a complete rotation around the shaft which must be completed before the sleeve interior configuration and the shaft external configuration start repeating a preceding symmetry.

10. The apparatus of claim 1, wherein the means for connecting the blades to the sleeve comprises means that allow air flow between a sleeve exterior and each of the blades.

11. The apparatus of claim 1, wherein the means for connecting the blades to the sleeve comprises two struts, a first of the two struts attached perpendicularly to an upper, inner surface of a first of said blades and to an upper portion of the sleeve, and a second of the two struts attached perpendicularly to a lower, inner surface of said first blade and to a lower portion of the sleeve.

12. A method of constructing a wind-driven electrical generator turbine, comprising:
providing an electrical generator;
installing a rotatable, elongated shaft to the electrical generator, the shaft comprising a shaft external configuration comprising a cross-sectional geometeric shape resulting in a plurality of vertices;
installing a plurality of blade segments onto the shaft to form a rotor, each of said blade segments comprising:
a sleeve comprising a sleeve interior configuration comprising a plurality of grooves formed longitudinally along an interior sleeve surface, the number of grooves on the sleeve proportional to the number of blade segments required to complete a single turn fraction of the rotor;
at least two blades that are positioned in a fixed relationship with respect to one another; and
means for connecting the blades to the sleeve;
wherein electricity is generated by the wind-driven electrical generator in response to rotation of the rotor.

13. The method of claim 12, wherein the turn fraction comprises a fraction of a complete rotation around the shaft which must be completed before the sleeve interior configuration and the shaft external configuration start repeating a preceding symmetry.

14. A segmented rotor for use in a wind-driven electrical turbine, comprising:
a plurality of rotor blade segments, each of the rotor blade segments configured for installation over a shaft that is connected to an electrical generator, each of the plurality of rotor blade segments comprising:
a sleeve for installation over the shaft, the sleeve comprising a sleeve interior configuration comprising a plurality of grooves formed longitudinally along an interior sleeve surface for mating with at least one of a plurality of vertices formed along a shaft surface;
at least two rotor blades that are positioned in a fixed relationship with respect to one another; and
means for connecting the rotor blades to the sleeve;
wherein the number of grooves on the sleeve is proportional to a quantity of rotor blade segments required to complete a single turn fraction of the rotor.

15. The apparatus of claim 14, wherein the turn fraction comprises a fraction of a complete rotation around the shaft which must be completed before the sleeve interior configuration and the shaft external configuration start repeating a preceding symmetry.

16. The apparatus of claim 14, wherein the means for connecting the rotor blades to the sleeve comprises at least one, fixed strut connecting each of said rotor blades, respectively, to a sleeve exterior.

17. The apparatus of claim 14, wherein the means for connecting the rotor blades to the sleeve comprises means that allow air flow between a sleeve exterior and each of the rotor blades.

18. The apparatus of claim 14, wherein the means for connecting the rotor blades to the sleeve comprises two struts, a first of the two struts attached perpendicularly to an upper, inner surface of a first rotor blade and to an upper portion of the sleeve, and a second of the two struts attached perpendicularly to a lower, inner surface of the first rotor blade and to a lower portion of the sleeve.

19. The apparatus of claim 14, wherein each of the rotor blades comprises a three-dimensional curved shape, whereby stiffness is imparted to the rotor blades via the curved shape design.

20. The apparatus of claim 14, wherein each of the rotor blades comprises a stiffening rib for adding stiffness to each of the rotor blades, respectively.

* * * * *